G. A. EWER.
FLY SHIELD.
APPLICATION FILED FEB. 24, 1909.

929,415.  Patented July 27, 1909.

Witnesses
Geo. L. Thom
Harold Megrew

Inventor
George A. Ewer
By
Geo. E. Tew
Attorney

UNITED STATES PATENT OFFICE.

GEORGE A. EWER, OF COGSWELL, NORTH DAKOTA.

FLY-SHIELD.

No. 929,415.   Specification of Letters Patent.   Patented July 27, 1909.

Application filed February 24, 1909. Serial No. 479,713.

*To all whom it may concern:*

Be it known that I, GEORGE A. EWER, a citizen of the United States, residing at Cogswell, in the county of Sargent and State of North Dakota, have invented certain new and useful Improvements in Fly-Shields, of which the following is a specification.

This invention is a device designed especially for the purpose of shielding the nose of a horse from flies, and particularly from the large horse flies which often attack the nose of an animal with objectionable consequences.

The object of the invention is to provide an improved device for the intended purpose which can be easily applied or removed, and which when in use will serve to effectively protect the nose of a horse and prevent flies from bothering the same while the animal is at work. The device is attached to the bridle and will drop off when the bridle is removed, whereby it may if necessary remain attached to the bridle at all times. Or it can be detached from the bridle if and when desired, by unfastening a pair of snap hooks or the like.

The invention is illustrated in the accompanying drawings in which—

Figure 1:
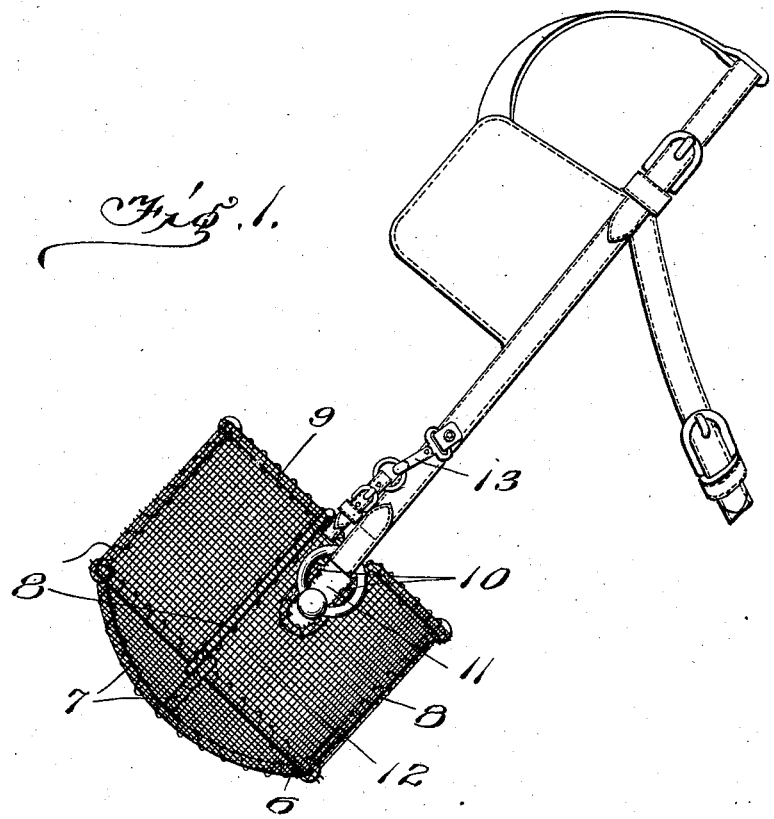
Figure 2:
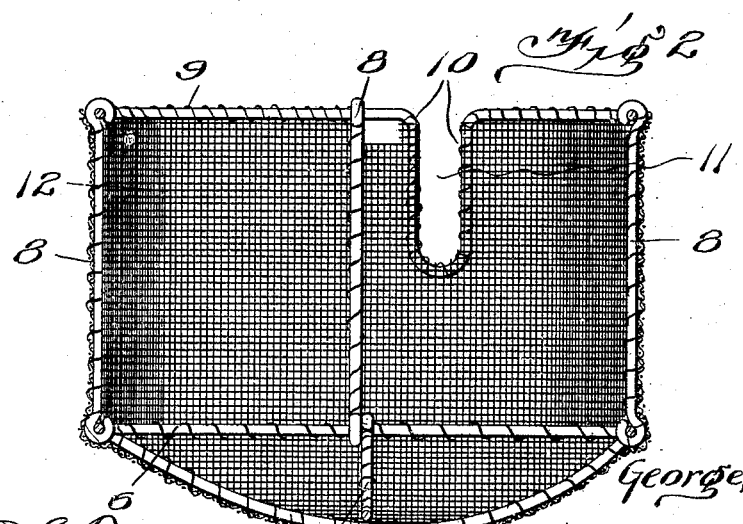

Figure 1 is a side view of a bridle provided with the device; Fig. 2 is a sectional view of the device detached.

The shield comprises a frame conveniently formed of wire and covered with wire netting or the like. The frame consists of a lower ring 6 across which extend wires 7 arranged at a right angle to each other and bowed slightly downward or outward. The ring is connected by longitudinal rods or wires 8 to a top wire or ring 9 which is bent downwardly, as indicated at 10, to form slots or recesses 11 on opposite sides, of proper size and shape to receive the ends of the bit which extend through said slots when the device is applied to the nose of the horse. The frame thus constructed is covered with wire netting 12 or the like, and the frame serves to support said cover and to space the same to an extent from the nose and jaws of the animal. The shield thus constructed is attached to the side straps of the bridle by means of snap hooks 13 or the like, a hole or ring being formed in or attached to the side straps for the purpose. When the shield is applied the bit slips down into the slots or recesses 11 thus enabling the shield to extend up on the horse's head a sufficient distance to completely cover the tender parts of the nose and jaws.

I claim:

1. A fly shield for horses comprising a frame covered with a screen and having slots in opposite sides arranged to receive the ends of a bit.

2. A fly shield for horses comprising a frame having upper and lower rings and connecting rods, and a screen covering the frame, the upper ring having inwardly-extending bends therein forming slots to receive the ends of a bit.

In testimony whereof I affix my signature in presence of two witnesses.

GEORGE A. EWER.

Witnesses:
CHAS. M. SCOVILLE,
C. MARCELLUS.